(12) United States Patent
Das

(10) Patent No.: US 8,010,972 B2
(45) Date of Patent: *Aug. 30, 2011

(54) APPLICATION CONNECTOR PARALLELISM IN ENTERPRISE APPLICATION INTEGRATION SYSTEMS

(75) Inventor: Pranta Das, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 975 days.

This patent is subject to a terminal disclaimer.

(21) Appl. No.: 11/926,037

(22) Filed: Oct. 28, 2007

(65) Prior Publication Data

US 2008/0052726 A1    Feb. 28, 2008

Related U.S. Application Data

(63) Continuation of application No. 10/245,131, filed on Sep. 17, 2002, now Pat. No. 7,386,857.

(51) Int. Cl.
G06F 3/00       (2006.01)
G06F 9/44       (2006.01)
G06F 9/46       (2006.01)
G06F 13/00      (2006.01)

(52) U.S. Cl. ........................................ 719/328; 719/320

(58) Field of Classification Search .................. 719/320, 719/328

See application file for complete search history.

(56) References Cited

U.S. PATENT DOCUMENTS

| 5,940,075 A | 8/1999 | Mutschler, III et al. ...... 345/335 |
| 6,085,198 A | 7/2000 | Skinner et al. ................ 707/103 |
| 6,105,067 A * | 8/2000 | Batra ............................ 709/227 |
| 6,208,345 B1 * | 3/2001 | Sheard et al. ................. 715/853 |
| 6,363,421 B2 * | 3/2002 | Barker et al. ................. 709/223 |
| 7,216,348 B1 * | 5/2007 | deCarmo ...................... 718/105 |
| 2003/0163600 A1 * | 8/2003 | Lankinen et al. ............. 709/318 |

OTHER PUBLICATIONS

"J2EE™ Connector Architecture" Sun Microsystems, Inc. (http://java.sun.com/j2eeconnector/), 2002.

Paper: Java Interoperability with Existing Code, V5R1 Update (IBM, http://www/as400.ibm.com), 2001.

"Application Connector Parallelism in Enterprise Application Integration (EAI) Systems," Pranta Das, Oct. 14-17, 2001.

* cited by examiner

*Primary Examiner* — Diem K Cao

(74) *Attorney, Agent, or Firm* — Michael Buchenhorner; Prentiss W. Johnson

(57) ABSTRACT

A system and method for responding to requests for processing made by an integration broker to an application having a single threaded application programmer interface, comprising receiving a request for processing; determining whether the received request is event-triggered or call-triggered; sending the request to a slave process assigned to event-triggered requests, when the request is event-triggered; and sending the request to a slave process assigned to call-triggered requests, when the request is call-triggered.

5 Claims, 9 Drawing Sheets

FIG. 5
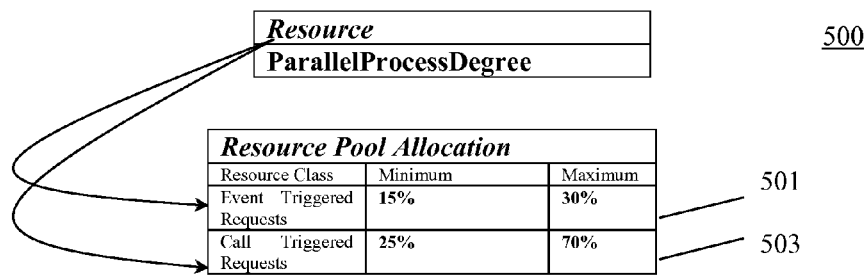
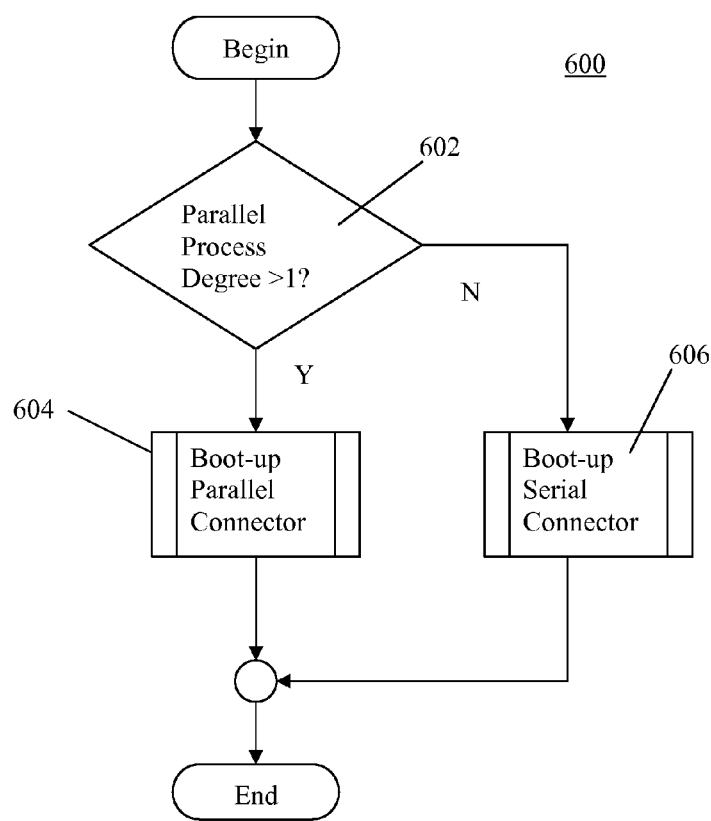
FIG. 6

APPLICATION CONNECTOR PARALLELISM IN ENTERPRISE APPLICATION INTEGRATION SYSTEMS

CROSS-REFERENCE TO RELATED APPLICATIONS

This application is a continuation of commonly-owned, co-pending U.S. patent application Ser. No. 10/245,131, filed on Sep. 17, 2002, which is incorporated by reference herein.

BACKGROUND OF THE INVENTION

1. Field of the Invention

The invention relates generally to information processing and more particularly to enterprise application integration systems having connectors providing an interface with a like number of application programs.

2. Description of the Background Art

Enterprise Application Integration (EAI) systems are those that allow a company's internal enterprise applications to operate together. EAI vendors offer a variety of products ranging from a low-level transport technology that must be heavily customized to meet a customer's needs, to integration-specific software tools that help build custom solutions, and to more complete, product-based integration solutions.

EAI systems can be broadly classified under point-to-point systems and hub & spoke systems. A traditional point-to-point integration scheme 100 comprises dedicated custom connectors 101 from each application system pair 102 as depicted in FIG. 1. Another approach is a hub & spoke approach illustrated in FIG. 2. Obviously, a point-to-point architecture is not easily extensible because for each additional application system that needs to be integrated, the number of connectors will increase exponentially. On the other hand, the hub & spoke integration scheme 200 comprises an integration hub (also known as an integration broker) 201 and several spoke connectors (one for each application system 102 to be integrated) as depicted in FIG. 2.

The integration hub 201 typically contains: a generic business object model, a transformation engine that maps all application specific business objects to the generic form and vice versa during the integration process and, a collaboration engine that executes any business process logic that is part of the integration synchronization process.

Whenever a new application needs to be integrated, only a single new connector needs to be added in such a scheme. Since EAI systems are usually poised in the heart of an enterprise's information system, their performance and scalability become critically important.

Although there is no current industry standard benchmark metric (such as the industry standard OLTP benchmark TPC-C for measuring the performance of an integration system, the performance of integration systems typically can be measured using two broad metrics:

Business Process Transactions per unit time: this is a measure of throughput of integration transactions made through the integration hub;

Average Response Time for Synchronous Requests: this is a measure of average latency of a synchronous request made to an EAI system.

For point-to-point EAI systems, typical scaling solutions involve the manual addition of extra processing spokes (application connectors), each of which unnecessarily complicates management and administration of the overall integration solution. On the other hand, while most hub and spoke EAI systems are fairly well geared in scaling for the integration hub, not much has been done to address the scalability of the spokes (application connectors).

Advances in multiprocessor architecture and sophisticated multithreaded software constructs have very quickly made sequential processing obsolete, especially in the design of scalable mission-critical transaction processing systems. The need for application connector parallelism in EAI systems arises from the fact that most Application Program Interface (API) libraries to which these application connectors are tied, have the following limitations: they lack thread-safety, which precludes the use of multi-threading in the application connector; and they lack re-entrance within the same process, which sometimes restricts application connectors to a single connection, session or activity in the application.

Thus, a single synchronization point in the application connector that serializes all calls to the application, whether for asynchronous event delivery or for synchronous requests, becomes the crux of a performance bottleneck in most application connectors. In other words, in spite of multiple requests coming into the application connector at any point in time, they are all sequentially executed on their entry into the application. This dramatically affects the overall throughput of the system and the latency of individual requests. With the advent of the web-enabled user-interfaces, the need for quicker response times becomes even more critical to an end-user. Most connector architectures do not cater to this need.

For connectors of applications that have thread-safe APIs, there are no inherent scalability problems, since the underlying connector can be multi-threaded and concurrent connections to the underlying applications can be made. However, most APIs are not thread-safe and some applications do not even allow more than one connection from the same process.

FIG. 3 shows a serial-process connector agent architecture 300. The architecture 300 is illustrated by three main components: an integration hub 302, a connector (also known as an adapter) 304, and an application 306. The connector 304 comprises a listener 310, and a single-threaded API 312. The API is not thread safe. In such cases, a mutex 314 needs to be set to lock prior to making the API call. This restricts the use of the application until the mutex is unlocked. This creates a bottleneck in a process which is expected to handle thousands of concurrent requests.

With the advent of the support for call-triggered requests in the e-business arena, the need for quicker response times becomes even more critical. This current connector agent model 300 will obviously not scale, especially if: a high volume of incoming requests comes into the agent; a barrage of application events are generated within a short amount of time; or, both of the above happen concurrently.

Thus, there are two issues that are of critical concern to an end-user: the latency of individual synchronous requests to an EAI system and the need to maximize throughput of the overall event flow through the system. Most API libraries are unable to adequately address these problems because 1) they lack thread-safety, which precludes the use of multi-threading in the application connector and 2) they lack re-entrance within the same process, which sometimes restricts application connectors to a single connection, session or activity in the application. There is thus a need for solutions to the shortcomings discussed above.

SUMMARY OF THE INVENTION

The invention concerns a new approach in overcoming the scalability limitations of application connectivity in EAI systems. Briefly, according to the invention, a method for responding to requests for processing made by an integration broker to an application having a single threaded application programmer interface (API), includes steps or acts of: spawning multiple connector processes (one master and at least one multiple slave processes); receiving a request for processing; determining the type of request; and, sending the request to a connector slave process assigned to that type of request.

BRIEF DESCRIPTION OF THE DRAWINGS

FIG. 5 shows a ParallelProcessDegree resource according to an embodiment of the invention.

FIG. 6 is a flow chart illustrating an application boot-up method according to an embodiment of the invention.

DETAILED DESCRIPTION OF AN EMBODIMENT OF THE INVENTION

In order to solve the scalability limitations discussed above, an application integration system described herein adopts a variant of the concept of server classes used by most Transaction Processing monitors (TP monitors) referred to herein as resource classes. An idea behind the concept of resource classes is to dedicate a pool of application connector processes, each of which has a devoted connection to the underlying application, for a given class of requests. This approach of having dedicated resources to handle different types of requests has the following advantages: 1) it is a tried and tested approach (as used in TP monitors); 2) it is easy to implement and maintain; and 3) it comes close to guaranteeing the prevention of starvation of any given type of request.

In a typical EAI environment, there are two primary types of requests:
 (i) event-triggered requests that originate from asynchronous events generated by an application, and
 (ii) call-triggered requests that originate from external clients such as a web-browser (these requests are generally considered higher priority).

It is desirable to minimize the average latency for call-triggered requests, while at the same time ensuring acceptable average latency for event-triggered requests and achieving optimal throughput for the overall system. Therefore, a separate resource class is dedicated to handle each type of request. In order to be able to distinguish between each type of request, each request is tagged as either an event-triggered request or a call-triggered request in the integration hub before it flows into the application connector process. The invention is applicable to both hub & spoke and point-to-point integration architectures. However, for the sake of simplicity, the preferred embodiment detailed here is based on a hub & spoke EAI system.

Figure 1:
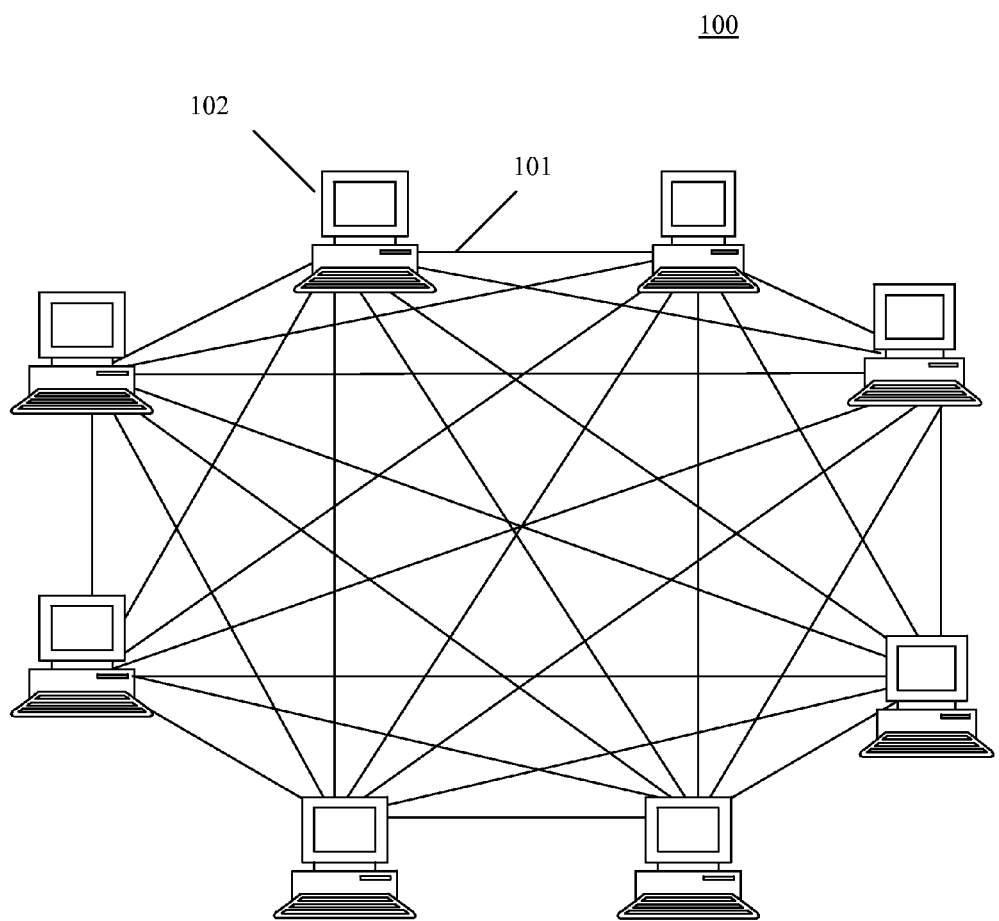
FIG. 1 shows a point-to-point integration architecture according to the prior art.
Figure 2:
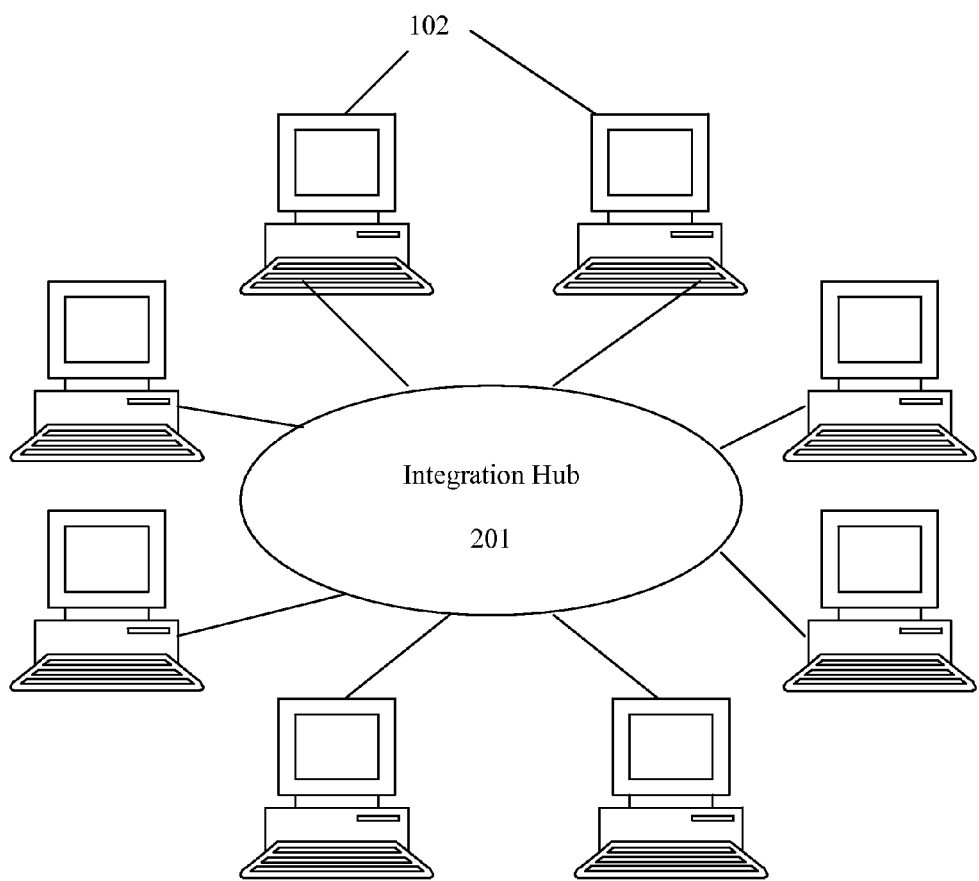
FIG. 2 shows a hub and spoke integration architecture according to the prior art.
Figure 3:
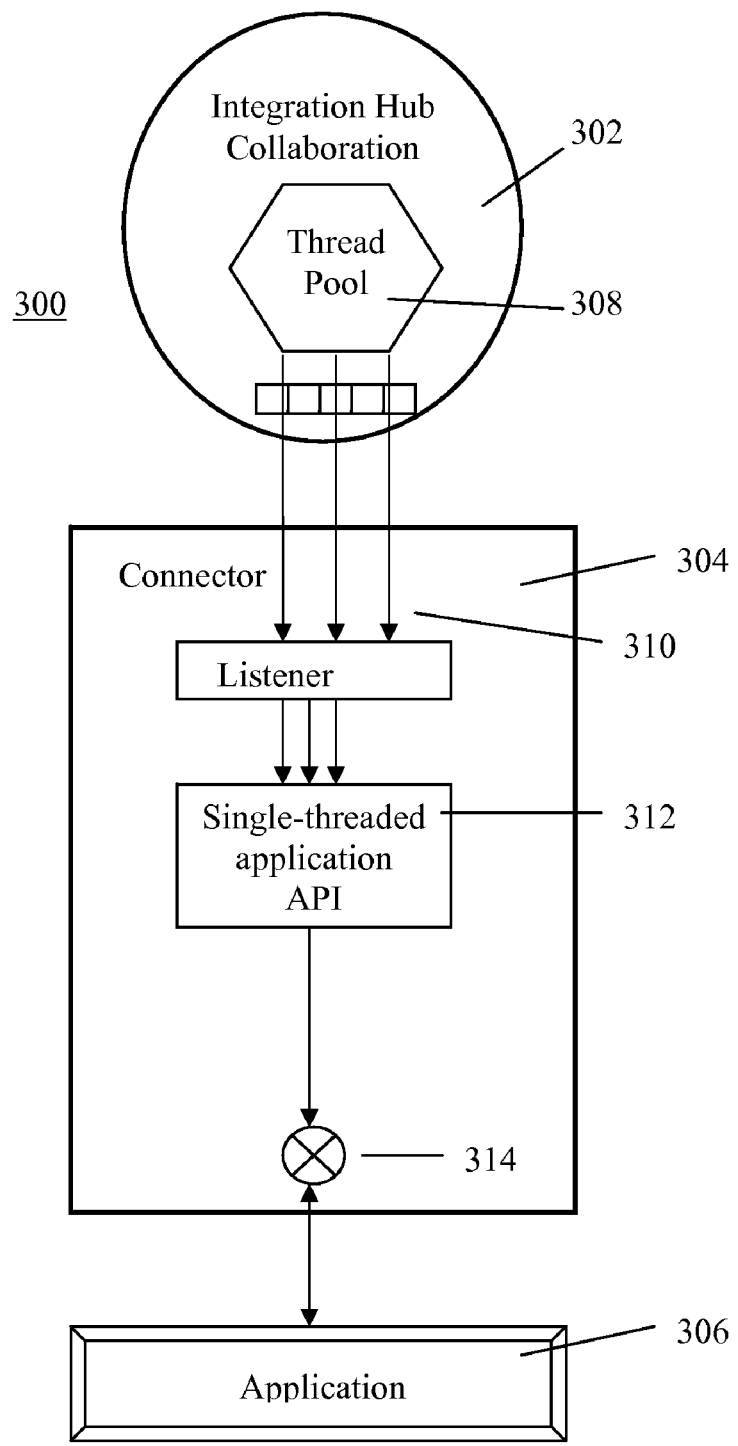
FIG. 3 shows a serial process connector architecture according to the prior art.
Figure 4:
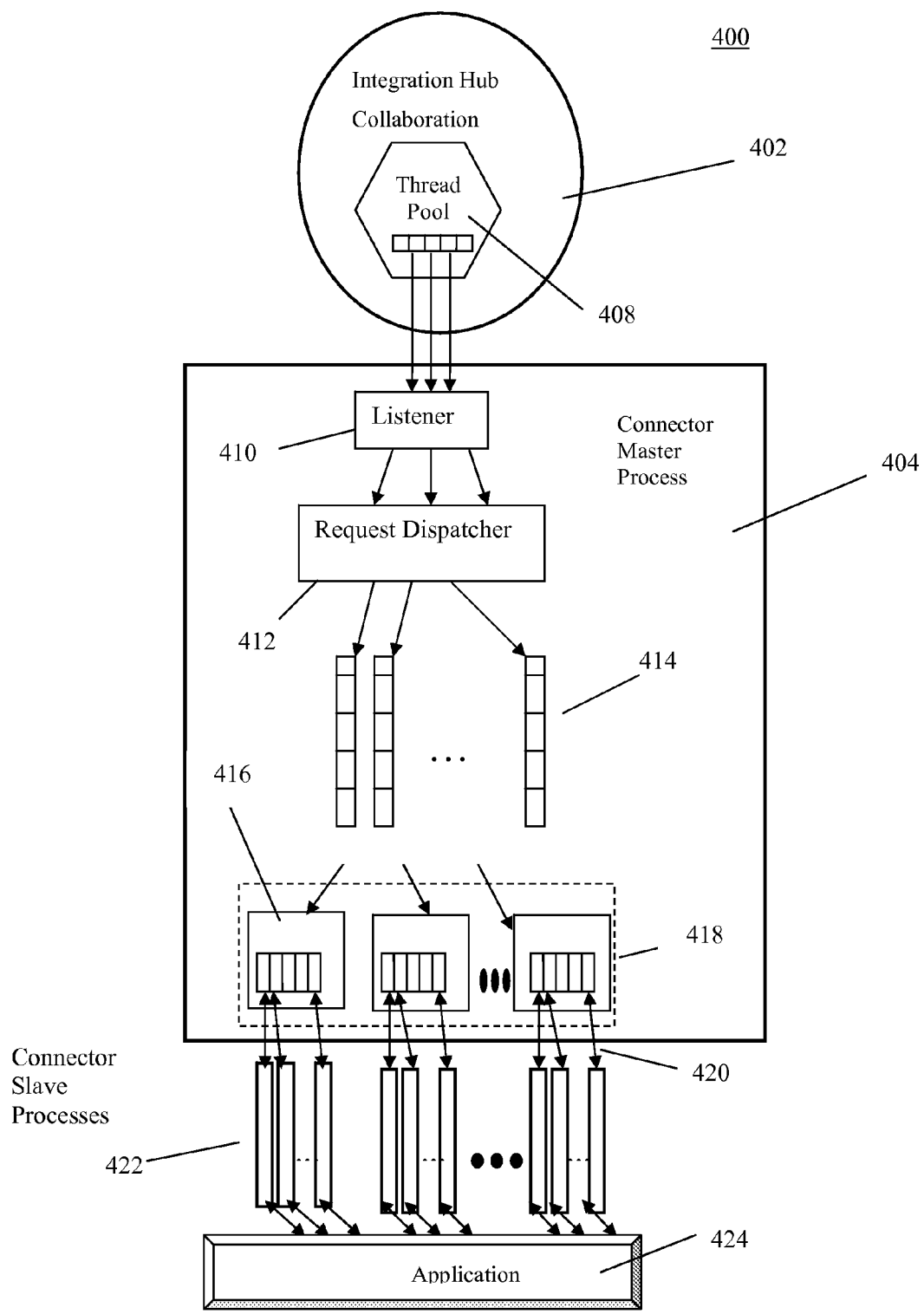
FIG. 4 shows a parallel process connector architecture according to an embodiment of the invention

FIG. 4 illustrates an application integration system 400 according to an embodiment of the invention. The system 400 comprises an integration hub 402, a connector master process 404, connector slave processes 422 and an application 424. The system 400 adopts a master-slave paradigm, where a connector master process 404 acts as a dispatcher of incoming requests received from the integration hub 402 and routes these requests to separate pools of connector slaves (or connector slave processes) 422. The system 400 represents a generic architecture that is extensible to multiple resource classes although the implementation depicted herein utilizes only two resource classes, i.e. event-triggered requests and call-triggered requests. Other resource classes are also contemplated within the spirit of the invention. The integration hub 402 performs a collaboration function which comprises a thread pool 408 that is available for processing requests received from either an event-triggered source or a call-triggered source.

The connector master process 404 comprises a listener 410 for accepting requests from the integration hub 402, a request dispatcher 412 for dispatching requests to a resource class request queue 414 based on the tag included in the request, and a resource cache 418 comprising a plurality of resource class pools and slave coordinators (slave pools) 416 for handling the received requests. The queues are dynamic data structures and their sizes will be limited only by available memory. The connector 404 may also comprise a plurality of connector slave processes 422 for processing the requests. These connector slave processes 422 can all belong to the shared resource cache 418, so that in order to optimize the utilization of resources, and hence avoid any waste, slave processes 422 can be scavenged from different pools 416 in case of a shortage in that pool. If no slaves are available in one resource pool, then a scavenge operation is attempted to obtain a slave from another pool and if that fails, the request waits until one becomes available. It is important to note that the master and slave processes will preferably operate within the same physical machine Referring to FIG. 5, there is shown a resource ParallelProcessDegree 500 that is used by the connector master process 404 to determine how many slaves it requires and to indicate the degree of parallelism of the application connector. It has a default value of one. This value will emulate a serial mode of execution. The value of this resource will determine the total number of slave processes that will be spawned by the connector master process 404 to handle incoming requests. This resource is dynamically configurable. This means that if the ParallelProcessDegree is reconfigured, then the connector process will not need to be restarted for the change to take effect. When increased, additional slave processes will be spawned. When decreased, the required number of existing slave processes, once they complete what they are doing, will be terminated. The allocation of the resource in the ParallelProcessDegree will be divided among two resource classes: event-triggered requests 501 and call-triggered requests 503. Each of these will incorporate a minimum percentage allocation and a maximum percentage allocation of the total resource. The maximum allocation percentage is the actual allocation and the total maximum allocations must add up to 100%. The minimum allocation percentages denote the minimum allotment of resources that will always be available in a pool, since resources may be scavenged/borrowed by other pools to ensure proper load balancing. The advantages of having percentages over fixed numerical values for resource allocation amounts is that a change in the resource amount automatically triggers recalculation of individual allocations and these need not be modified separately. An overall advantage of this generic approach over providing separate configuration properties for each allocation is that it is easily extensible and reusable across other components.

Referring to FIG. 6, there is shown a flow chart illustrating an application connector boot-up method 600 according to an embodiment of the invention. First, in step 602 the system determines whether the ParallelProcessDegree is greater than one. If the ParallelProcessDegree is greater than one a predefined process 604 boots up the parallel connector. If the ParallelProcessDegree is not greater than one a predefined process 606 boots up the serial connector.

Figure 7:
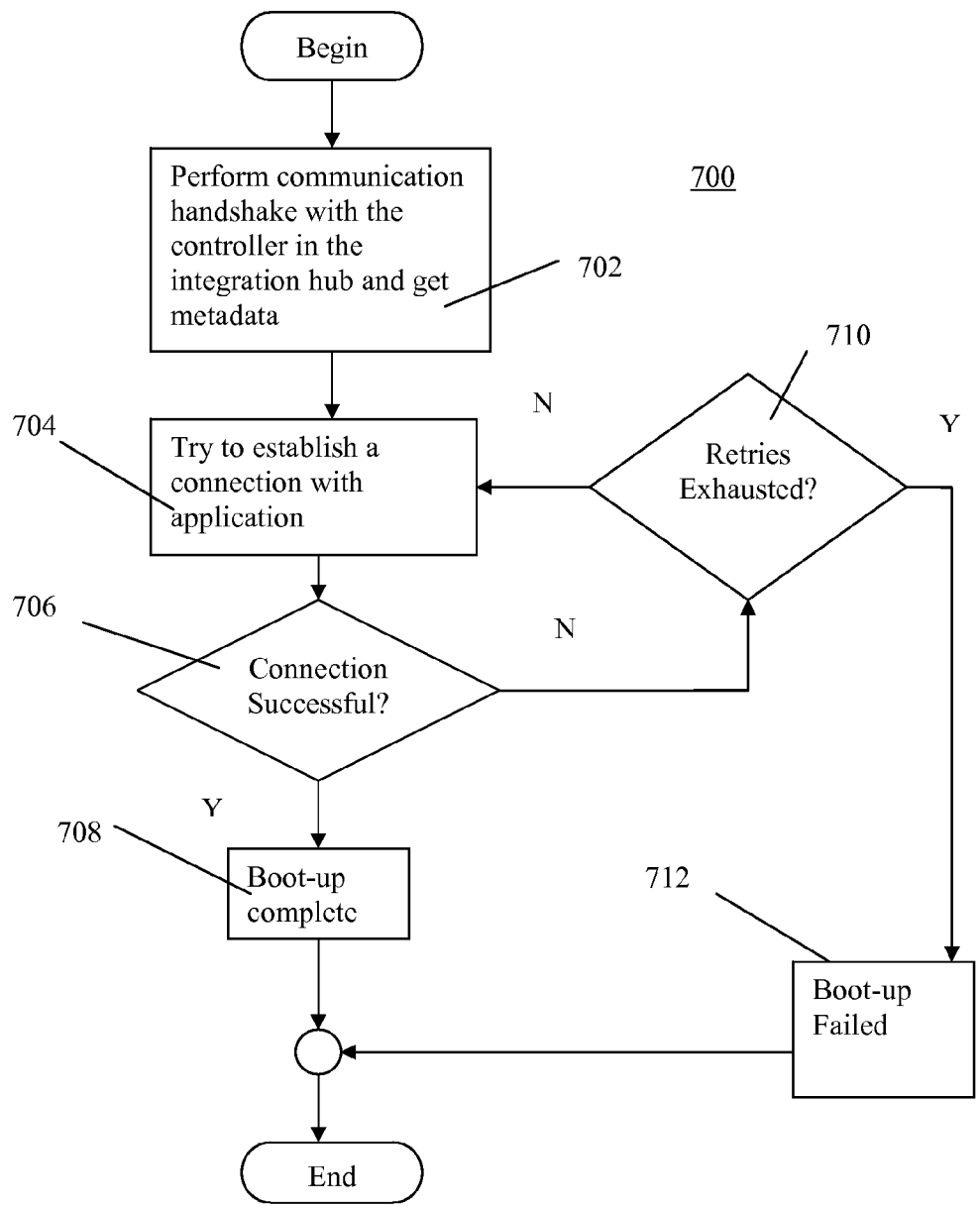
FIG. 7 is a flow chart illustrating a boot-up serial connector process according to an embodiment of the invention.

FIG. 7 shows a flow chart illustrating a boot-up serial connector process 700 according to an embodiment of the invention. In step 702 the system performs a communication handshake with the controller (shown in FIG. 10) of the integration hub 402 and receives the business object definitions and configuration properties (metadata). In step 704 the system tries to establish a connection with the application. Then a decision 706 is made to determine whether the connection was successful. If the connection was successful the boot-up is complete in step 708. If the connection was not successful a further decision 710 determines whether the retries to establish a connection have been exhausted. If the retries are exhausted step 712 determines that the boot-up has failed.

Figure 8:
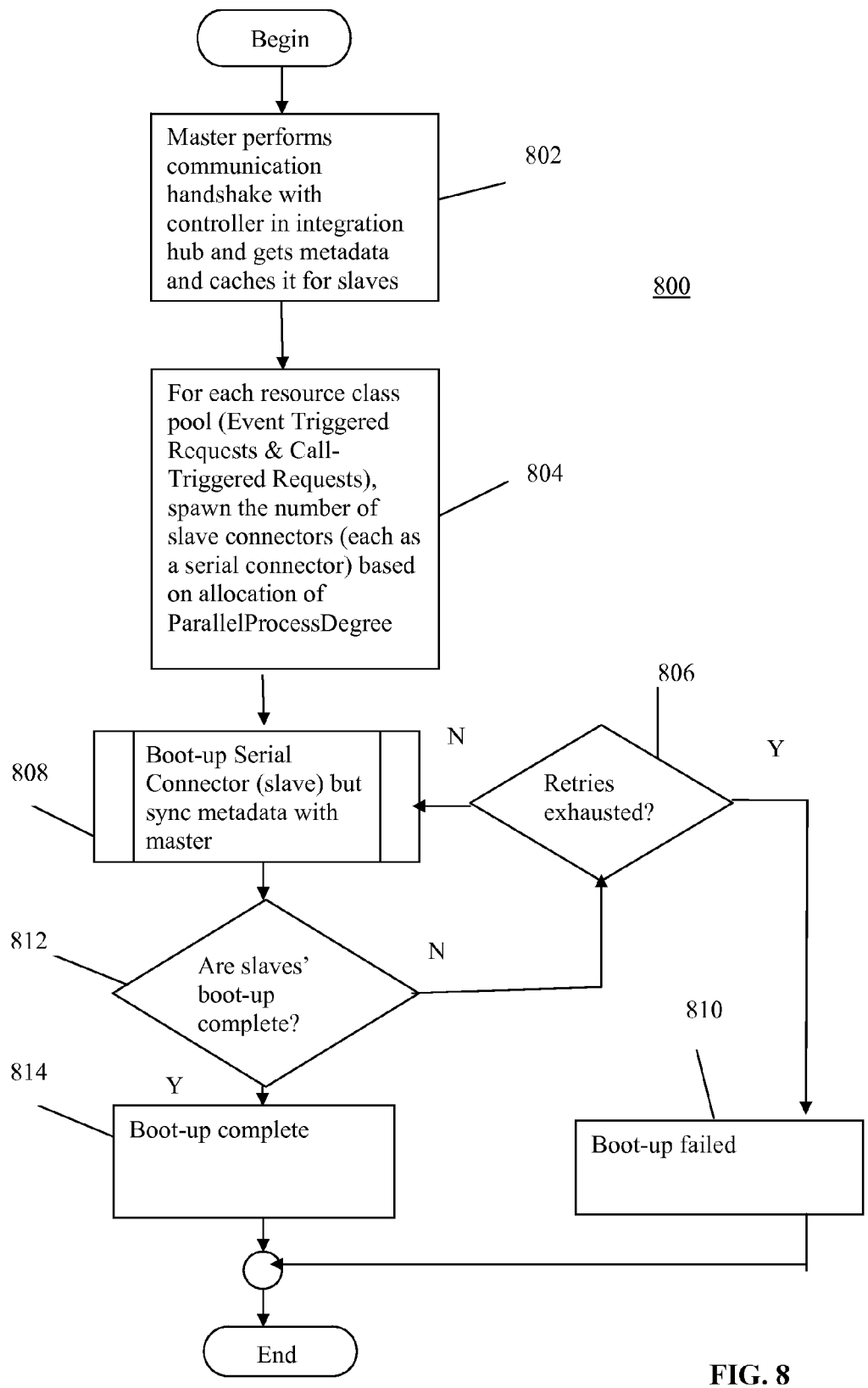
FIG. 8 is a flow chart illustrating a boot-up parallel connector process according to an embodiment of the invention.

Referring to FIG. 8 there is shown a flow chart illustrating a boot-up parallel connector process 800 according to an embodiment of the invention. In step 802 the connector master process 404 performs a communication handshake with the controller in the integration hub 402 and retrieves metadata and caches it for the slaves. Each agent (master or slave) process will own its own in-memory copy of the metadata. Step 804, for each resource class pool, spawns a number of slave connectors (each as a serial connector) based on the allocation amount it receives from the ParallelProcessDegree 500.

In step 808 the slave connectors spawned in step 804 are booted up. The metadata from these slave connectors is synced with the master. Then in step 812 a decision must be made to determine if the slaves' boot-up is complete. If the boot-up is determined to be complete in step 814, the process is ended. Else, if the boot-up is not complete, a decision is made in step 806 to determine if the retries are exhausted. If not, then the boot-up process is re-initiated. If the retries are exhausted, then it is determined that the boot-up has failed in step 810 and the process is ended.

Figure 9:
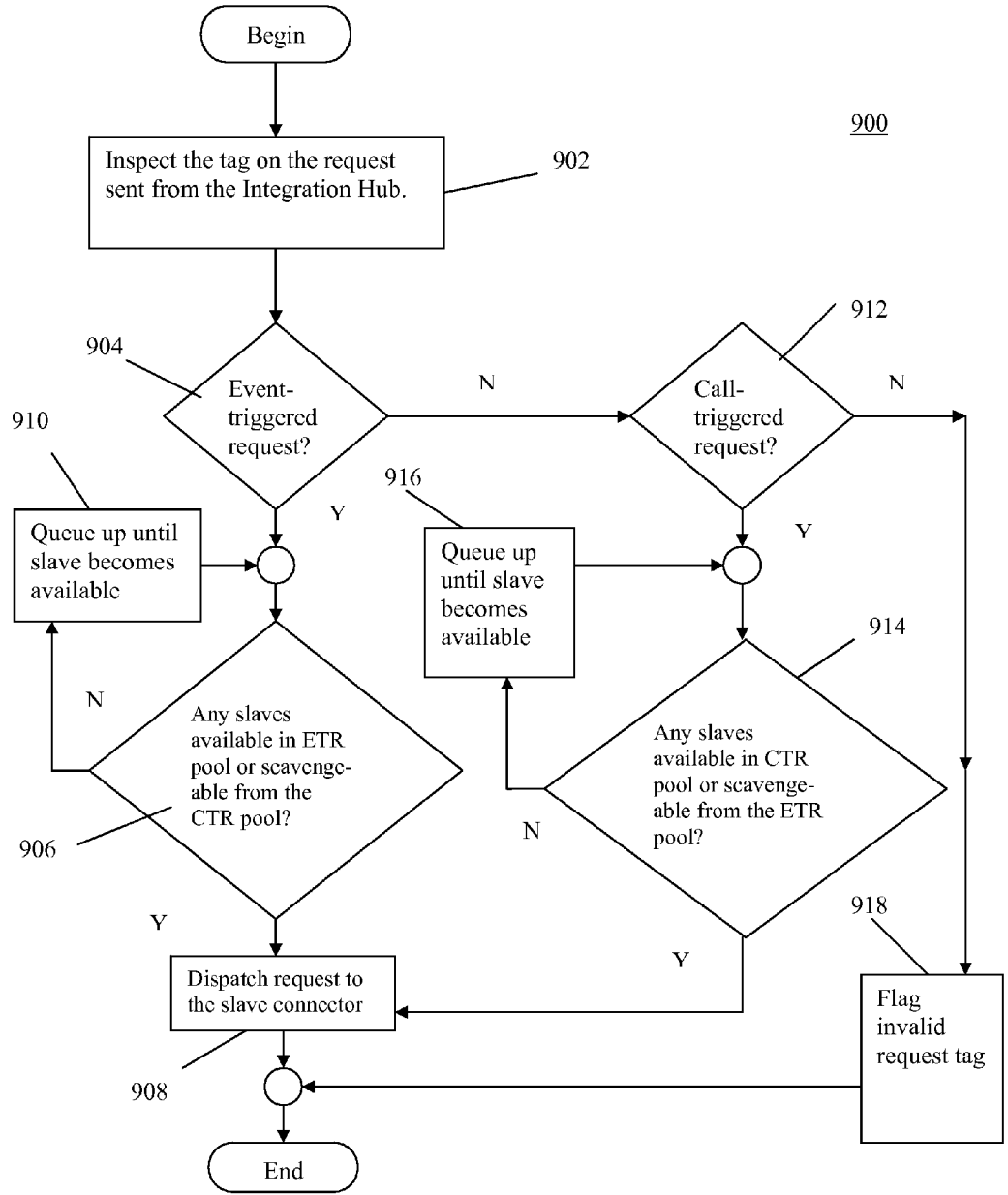
FIG. 9 is a flow chart illustrating a parallel connector process according to an embodiment of the invention.

Referring to FIG. 9 there is shown a flow chart illustrating a parallel connector process 900 according to an embodiment of the invention. The process begins in step 902 wherein the request dispatcher 412 inspects the tag on the request sent from the integration hub 402 in order to determine, in step 904, if this is an event-triggered request. If the request is determined to be an event-triggered request, then in step 906 a further decision must be made to determine if there are any slaves available in the event-triggered request pool or if there are slaves scavengeable from the call-triggered request pool. If there are slaves available from either pool, then in step 908 the request is dispatched to the connector slave processes 422, else the call is queued up waiting for an available slave in step 910. If the request is deemed to be a call-triggered request in step 912, a further determination 914 is made to determine if there are slaves available in the call-triggered pool or if there are any slaves scavengeable from the event-triggered pool. If there is at least one slave available, the call is dispatched to the connector slave processes 422 in step 904, otherwise the request will have to queue up until a slave becomes available in step 916. If it is determined that the request is neither a call-triggered request nor an event-triggered request, then in step 918 an invalid request tag is flagged and the process ends with no request being dispatched.

Figure 10:
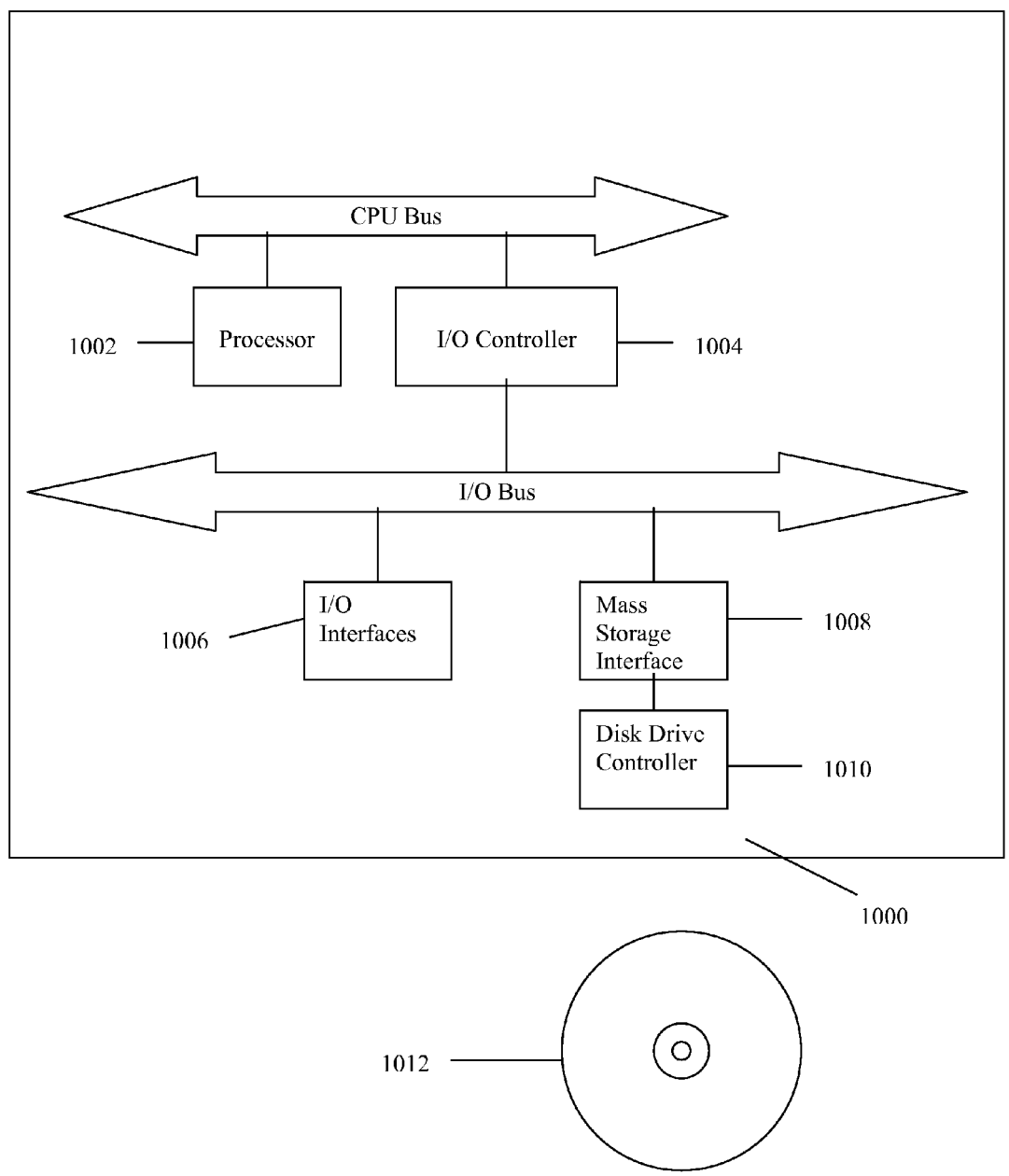
FIG. 10 is a high level block diagram of basic system components for implementing an embodiment of the invention.

Referring to FIG. 10 there is shown a representation of an application integration system 1000 for responding to requests for processing made by an integration broker to an application that has a single threaded or non-reentrant API (Application Programming Interface). This includes a simplified representation of an information processing system, 1001 which includes a processor 1002, an I/O controller 1004, I/O interfaces 1006, a mass storage interface 1008 and a disk drive controller 1010. In one embodiment the processor 1002 operates as a controller in the integration hub. The I/O interfaces 1006 could include CD/DVD media 1012. It should be understood that this illustrates a very basic system to represent an embodiment of the invention.

The integration system described herein can be implemented in various embodiments including as a method, a dedicated or programmable data processing apparatus, or a computer program product. While it is understood that parallelism can be achieved using either multiple threads or processes, various approaches for scheduling these parallel entities could potentially be adopted in order to realize our performance requirements for this invention. Therefore, while there has been described what is presently considered to be the preferred embodiment or embodiments, it will be understood by those skilled in the art that other modifications can be made within the spirit of the invention.

Therefore we claim:

1. A method for responding to requests with a connector, said method comprising steps of:
   spawning, with the connector, at least one connector master process and a plurality of connector slave processes, each of the connector processes having a connection to an application;
   receiving at the connector master process a request for processing from an integration broker requesting a service of an application that has a single-threaded or non-reentrant application programming interface;
   determining that the request is of an event triggered type;
   determining whether the connector slave process is available;
   sending the request to at least one of the plurality of connector slave processes normally dedicated to that type of request, when the connector slave process is available; and
   sending the event-triggered request to a process normally assigned to call-triggered requests when there are not any available connector slave connector processes assigned to event-triggered requests.

2. The method of claim 1, wherein the sending step comprises sending the request to a slave process assigned to event-triggered requests, when the request is event-triggered.

3. An application integration system for responding to requests for processing, comprising a processor configured to:
   spawn, with a connector, at least one connector master process and a plurality of connector slave processes, each of the connector processes having a connection to an application;
   receive at the connector master process the request for processing made by an integration broker to an application that has a single threaded or non-reentrant application programming interface;

determine whether the request is of a call-triggered or event-triggered type;

sending the request to at least one of the plurality of connector slave processes normally dedicated to that type of request, when the at least one of the plurality of connector slave processes is available;

sending an event-triggered request to a process normally assigned to call-triggered requests when there are not any available connector slave processes assigned to event-triggered requests; and sending a call-triggered request to a process normally assigned to event-triggered requests when there are not any available connector slave processes assigned to call-triggered requests.

4. The system of claim 3, further comprising the connector for executing a connector master process.

5. A method for responding to requests with a connector, said method comprising steps of:

spawning, with the connector, at least one connector master process and a plurality of connector slave processes, each of the connector processes having a connection to an application;

receiving at the connector master process a request for processing from an integration broker requesting a service of an application that has a single-threaded or non-reentrant application programming interface;

determining that the request is of a call-triggered type;

determining whether the connector slave process is available;

sending the request to at least one of the plurality of connector slave processes assigned to call-triggered requests, when the connector slave process is available; and sending the call-triggered request to a connector process normally assigned to event-triggered requests when there are not any available connector slave connector processes assigned to call-triggered requests.

* * * * *